(12) United States Patent
Suba-Miura et al.

(10) Patent No.: US 8,898,125 B2
(45) Date of Patent: Nov. 25, 2014

(54) METHOD AND APPARATUS FOR AWARDING TROPHIES

(71) Applicant: Sony Computer Entertainment Inc., Tokyo (JP)

(72) Inventors: Victor O. Suba-Miura, Foster City, CA (US); Stewart Sargaison, Foster City, CA (US)

(73) Assignees: Sony Corporation, Tokyo (JP); Sony Computer Entertainment Inc., Tokyo (JP)

( * ) Notice: Subject to any disclaimer, the term of this patent is extended or adjusted under 35 U.S.C. 154(b) by 0 days.

(21) Appl. No.: 13/622,797

(22) Filed: Sep. 19, 2012

(65) Prior Publication Data

US 2013/0073551 A1 Mar. 21, 2013

Related U.S. Application Data

(60) Provisional application No. 61/537,406, filed on Sep. 21, 2011.

(51) Int. Cl.
*G06F 17/00* (2006.01)
*G06F 17/30* (2006.01)

(52) U.S. Cl.
CPC ..................................... *G06F 17/30* (2013.01)
USPC ........................................... 707/702; 463/25

(58) Field of Classification Search
CPC . G07F 17/3244; G07F 17/32; G07F 17/3255; G07F 17/3258; G07F 17/3288
USPC ............... 707/702; 709/217, 219; 463/25, 42
See application file for complete search history.

(56) References Cited

U.S. PATENT DOCUMENTS

| | | | |
|---|---|---|---|
| 2005/0101368 A1* | 5/2005 | Thomas | 463/16 |
| 2005/0149586 A1* | 7/2005 | Lange et al. | 707/205 |
| 2006/0068892 A1* | 3/2006 | Gomez et al. | 463/20 |
| 2006/0223611 A1* | 10/2006 | Baerlocher et al. | 463/16 |
| 2007/0077997 A1* | 4/2007 | Johnson | 463/42 |
| 2007/0283234 A1* | 12/2007 | Hung | 714/814 |
| 2008/0026833 A1* | 1/2008 | Yoshizawa | 463/26 |
| 2010/0056264 A1* | 3/2010 | Jordan et al. | 463/25 |
| 2010/0234085 A1* | 9/2010 | Kup-Ferroth | 463/16 |
| 2011/0070944 A1* | 3/2011 | de Waal et al. | 463/25 |
| 2011/0092282 A1 | 4/2011 | Gary | |
| 2011/0105216 A1 | 5/2011 | Cohen et al. | |
| 2012/0329549 A1* | 12/2012 | Johnson | 463/25 |

FOREIGN PATENT DOCUMENTS

WO    WO 2010-151547    12/2010

* cited by examiner

*Primary Examiner* — Phong Nguyen
(74) *Attorney, Agent, or Firm* — Frommer Lawrence & Haug LLP; William S. Frommer; Paul A. Levy

(57) ABSTRACT

A method and apparatus for adding trophy support games that do not have trophies without modifying the original game. The method and apparatus are used to detect particular disk access, use the detected disk access as potential trophy triggers in games, and recognize the triggers while a game is played. Trophies are awarded based on the triggers, and the awarded trophies are stored.

13 Claims, 6 Drawing Sheets

400

METHOD AND APPARATUS FOR AWARDING TROPHIES

BACKGROUND

1. Field of the Invention

This invention relates generally to a system and method of awarding trophies in previously released or sold video games, without modifying the original game. More specifically, the present invention relates to defining, detecting and awarding a set of trophies for the players of the previously released games.

2. Background Discussion

Generally, trophies are an important part of modern gaming. However, often, older games do not have the capability to award trophies to player. In order to enhance the gaming experience, it would be desirable to be able to award trophies to users playing older games that were not introduced with the trophy feature.

SUMMARY

Embodiments of the present invention are directed to methods and apparatus for assigning one or more trophies for an existing game, or title, to a user.

One embodiment of the present invention is directed to a method of for assigning one or more trophies to a user. The method includes accessing media content and defining one or more trophies. A trigger associated with the media content is defined and the trigger is detected during media content access. One or more trophies are assigned to a user account that is associated with the user in response to the detected trigger.

Another embodiment of the present invention is directed to the method of assigning one or more trophies described above in which the defined trigger includes accessing a particular sector on a disk that stores the media content.

Yet another embodiment of the present invention is directed to the method of assigning one or more trophies described above in which the defined trigger includes accessing a plurality of sectors in a particular sequence.

Yet another embodiment of the present invention is directed to the method of assigning one or more trophies described above which the defined trigger includes accessing a plurality of sectors in a particular sequence based on previous triggered disk access.

Yet another embodiment of the present invention is directed to the method of assigning one or more trophies described above further includes storing trophies that have been assigned in a database.

Yet another embodiment of the present invention is directed to the method of assigning one or more trophies described above in which each of the one or more trophies is assigned to a single user.

Yet another embodiment of the present invention is directed to the method of assigning one or more trophies described above in which when a sequence of triggers is required to trigger a trophy, partially earned trophies are stored in the database.

Yet another embodiment of the present invention is directed to the method of assigning one or more trophies described above further includes analyzing content of the disk media and in-game disk reading patterns to produce a palette of potential trophy triggers, using semi-automated tools.

Yet another embodiment of the present invention is directed to the method of assigning one or more trophies described above in which the produced palette of potential trophy triggers is used to define the set of trophies.

Yet another embodiment of the present invention is directed to the method of assigning one or more trophies described above further includes scanning the content of the disk, and identifying the file format. Thus, making the content viewable in a tool.

Yet another embodiment of the present invention is directed to the method of assigning one or more trophies described above in which the user views the files and selects a trophy trigger among a plurality of potential trophy triggers.

Yet another embodiment of the present invention is directed to the method of assigning one or more trophies described above in which the file names on the disk determine a corresponding file.

Yet another embodiment of the present invention is directed to the method of assigning one or more trophies described above in which the user defines a trigger by actuating a command at a particular time during media content access when tracking in-game disk reading patterns.

Yet another embodiment of the present invention is directed to the method of assigning one or more trophies described above further includes identifying a potential trigger by analyzing the disk reading patterns for unique sectors accessed within a predetermined time period of displaying a trophy.

Other embodiments of the present invention include the methods described above but implemented using apparatus or programmed as computer code to be executed by one or more processors operating in conjunction with one or more electronic storage media.

BRIEF DESCRIPTION OF THE DRAWINGS

To the accomplishment of the foregoing and related ends, certain illustrative embodiments of the invention are described herein in connection with the following description and the annexed drawings. These embodiments are indicative, however, of but a few of the various ways in which the principles of the invention may be employed and the present invention is intended to include all such aspects and their equivalents. Other advantages, embodiments and novel features of the invention may become apparent from the following description of the invention when considered in conjunction with the drawings. The following description, given by way of example, but not intended to limit the invention solely to the specific embodiments described, may best be understood in conjunction with the accompanying drawings, in which.

DETAILED DESCRIPTION

Figure 1:
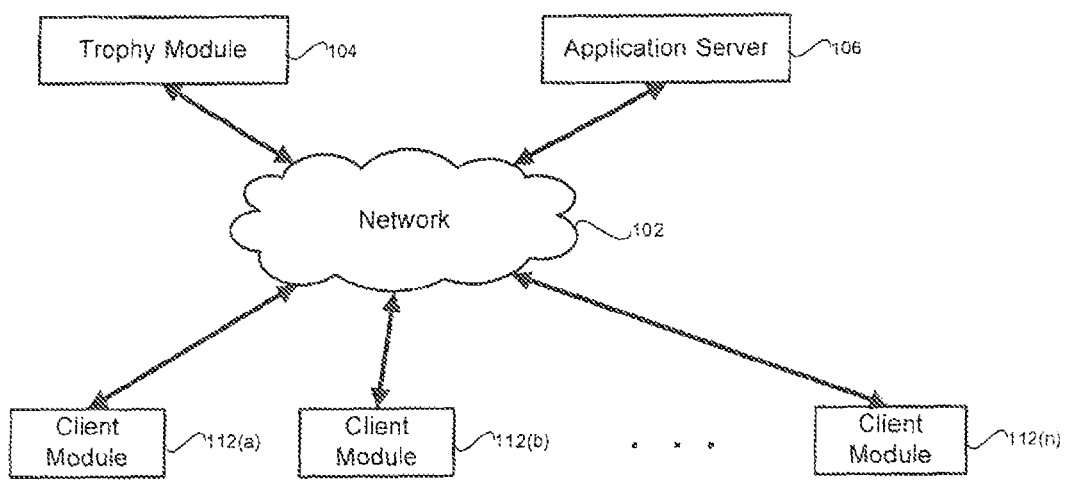
FIG. 1 illustrates an example of a network that supports embodiments of the present invention.

It is noted that in this disclosure and particularly in the claims and/or paragraphs, terms such as "comprises," "comprised," "comprising," and the like can have the meaning attributed to it in U.S. patent law; that is, they can mean "includes," "included," "including," "including, but not limited to" and the like, and allow for elements not explicitly recited. Terms such as "consisting essentially of" and "consists essentially of" have the meaning ascribed to them in U.S. patent law; that is, they allow for elements not explicitly recited, but exclude elements that are found in the prior art or that affect a basic or novel characteristic of the invention. These and other embodiments are disclosed or are apparent from and encompassed by, the following description. As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Furthermore, the detailed description describes various embodiments of the present invention for illustration purposes and embodiments of the present invention include the methods described and may be implemented using one or more apparatus, such as processing apparatus coupled to electronic media. Embodiments of the present invention may be stored on an electronic media (electronic memory, RAM, ROM, EEPROM) or programmed as computer code (e.g., source code, object code or any suitable programming language) to be executed by one or more processors operating in conjunction with one or more electronic storage media.

Embodiments of the present invention may be implemented using one or more processing devices, or processing modules. The processing devices, or modules, may be coupled such that portions of the processing and/or data manipulation may be performed at one or more processing devices and shared or transmitted between a plurality of processing devices.

Indeed, the present invention may be implemented in a distributed or "cloud" computing environment in which shared resources, software and information are provided to computers and other devices over a network, which may be, for example, the Internet, "Cloud computing" typically involves delivering hosted services over the Internet. A cloud service typically has three distinct characteristics that differentiate it from traditional hosting. One characteristic is that it is sold on demand, typically by the minute or the hour; secondly, it is elastic—a user can have as much or as little of a service as they want at any given time; and thirdly, the service is usually fully managed by the provider (the consumer needs nothing but a personal computer and Internet access). Significant innovations in virtualization and distributed computing, as well as improved access to high-speed Internet have accelerated use of cloud computing. The cloud can be private or public. A public cloud typically sells services to anyone on the Internet. (Currently, Amazon Web Services™ is the largest public cloud provider.) A private cloud is a proprietary network or a data center that supplies hosted services to a limited number of people. When a service provider uses public cloud resources to create their private cloud, the result is called a virtual private cloud. Private or public, the goal of cloud computing is to provide easy, scalable access to computing.

"Distributed computing", or "distributed systems" relate to a system of multiple autonomous computers or processing devices or facilities that communicate through a network. The computers interact with each other in order to achieve a particular goal. A computer program that runs in a distributed system is typically referred to as a "distributed program" and "distributed programming" is the process of writing such programs. Distributed computing also refers to the use of distributed systems to solve computational problems. Typically, in distributed computing, a problem is divided into multiple tasks, each of which is solved by one or more computers.

In general, distributed computing is any computing that involves multiple computers remote from each other that each has a role in a computation problem or information processing. The computers can share memory and/or processing capability and/or functionality.

FIG. 1 shows a network environment that supports embodiments of the present invention. As shown in FIG. 1, the system includes a communication network 102, a trophy module 104, an application server 106, and a plurality of client modules 112(a), 112(b) . . . 112(n) (where "n" is any suitable number).

The network 102 is, for example, any combination of linked computers, or processing devices, adapted to transfer and process data. The network 102 may be private Internet Protocol (IP) networks, as well as public IP networks, such as the Internet that can utilize World Wide Web (www) browsing functionality. An example of a wired network is a network that uses communication buses and MODEMS, or DSL lines, or a local area network (LAN) or a wide area network (WAN) to transmit and receive data between terminals. An example of a wireless network is a wireless LAN. Global System for Mobile Communication (GSM) is another example of a wireless network. The GSM network is divided into three major systems which are the switching system, the base station system, and the operation and support system (GSM). Also, IEEE 802.11 (Wi-Fi) is a commonly used wireless network in computer systems, which enables connection to the Internet or other machines that have Wi-Fi functionality. Wi-Fi networks broadcast radio naves that can be picked up by Wi-Fi receivers that are attached to different computers.

The trophy module, or facility, or unit, 104 is typically one or more processors with associated memory, such as computers, or other processing devices such as a server, desktop computer or any processing module with adequate storage and processing functionality. Specifically, trophy module 106 may be utilized in a cloud computing or distributed computing environment.

The application server module, or facility, or unit, 106 is typically one or more processors with associated memory, such as server computers, general computers, or other processing devices such as a desktop computer, laptop computer, and the like. It is noted that the application server 106 may be a single server, and also may be implemented as one or more separate servers. Specifically, application server 106 may be utilized in a cloud computing or distributed computing environment.

Client modules 112(a) . . . (n) (generally referred to as 112, herein) typically include devices with processing capabilities and memory and an output displays, such as, laptop computers, desktop computers, cell phone, personal digital assistant (PDA), wireless handheld device, PLAYSTATION™, PSP™ and the like. The client modules 112 may be capable of processing and storing and displaying data themselves or merely capable of accessing processed and stored data from another location (i.e., both thin and fat terminals) and displaying the accessed or retrieved data. It is also an embodiment of the present invention that the functionality of server 106 could also be part of server 106 and/or client device, or terminal 112.

The trophy module 104, the application server 106 and the client modules 112(a), 112(b) . . . 112(n) are coupled to network 102 via an associated bi-directional communication medium, which may be for example a serial bus such as IEEE 1394, or other wire or wireless transmission medium.

Figure 2:
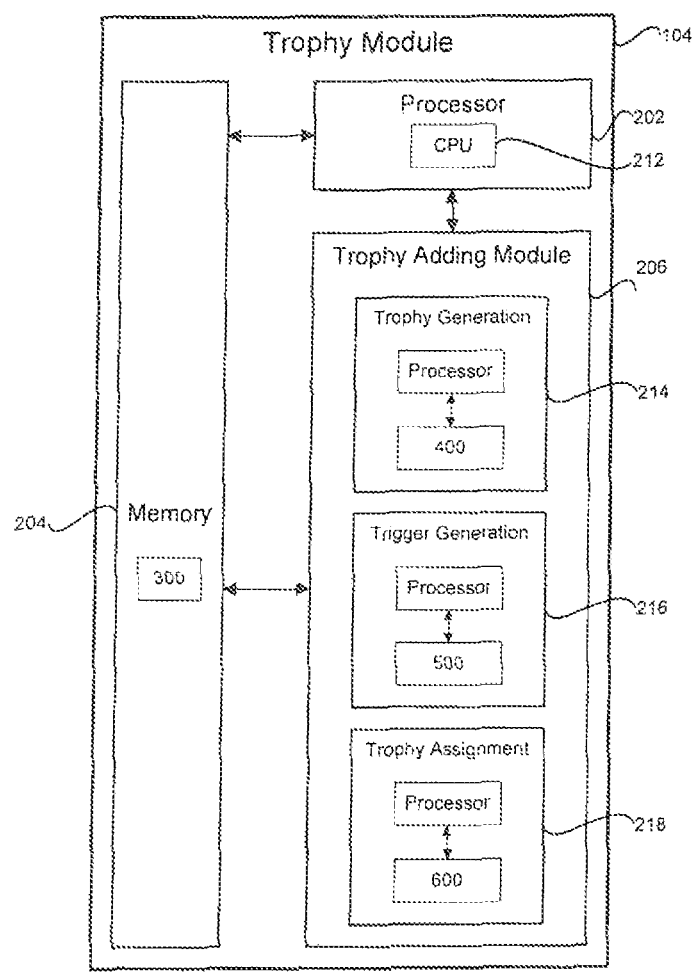
FIG. 2 shows an example of trophy module according to an embodiment of the present invention.

FIG. 2 illustrates an example of a trophy module 104 according to an embodiment of the present invention. A trophy module 104 includes a processor module 202, a memory module 204 and a trophy adding module 206. The trophy module 104 may be a module, "plug-in" unit, stand-alone unit or other facility that resides on another module or device. For example, trophy module may be a component of or executed by client module(s) 112 and/or server 106, as described herein. The trophy module 104 may be operatively coupled to a system, such as components 112, 102 and 106 of FIG. 1, so that the functionality of trophy module 104 may be utilized with those components. Thus, the trophy module 104 may be retro-fitted to be accessed with older, previously released games that were not released or sold with this functionality.

Processor module 202 is coupled to the trophy adding module 206 via an associated communication link to enable processor module 202 and memory 204 to coordinate processing operations of the modules shown in FIG. 2. The processor module 202 includes a CPU 212, which is typically a processor that includes an arithmetic logic unit (ALU) (not shown), which performs arithmetic and logical operations, and a control unit (CU) (not shown), which extracts instructions from memory and decodes and executes them, utilizing the ALU when necessary. An I/O interface may be used to operatively couple the components of processor module 202.

Memory module 204 stores programs, which include, for example, a web browser, algorithms, as well as typical operating system programs (not shown), input/output (I/O) programs (not shown), BIOS programs (not shown) and other programs that facilitate operation of trophy module 104. The web browser (not shown) is for example an Internet browser program such as Internet Explorer™. Memory module 204 may be, for example, an electronic storage medium, such as an electronic storage repository that can store data used by trophy module 104. The memory module 204 may include, for example, RAM, ROM, EEPROM or other memory media, such as an optical disk, optical tape, CD, or a floppy disk, a hard disk, or a removable cartridge, or transitory or non-transitory electronic storage medium, on which digital information is stored in the form of bits. The memory module 204 may also be remote memory coupled to processing module 202 via wired or wireless bi-directional communication medium.

Trophy adding module 206 includes all the trophy adding functionality of various levels. For example, trophy adding module 206 includes trophy generation module 214, trigger generation module 216, and trophy assignment module 218.

Trophy generation module 214 is used to define and generate a set atrophies. The defined and generated trophies may be stored in the memory, or other memory location. One example of such a memory is shown as memory module 400 in trophy generation module 214. Alternatively, the memory location may be remote from the trophy module 104.

Trigger generation module 216 is used to define and generate in-game triggers. The defined and generated triggers may also be stored in the memory, or other memory location. One example of such a memory is shown as memory module 500 in trigger generation module 216. Alternatively, the memory location may be remote from the trophy module 104.

Trigger assignment module 218 is used to detect the in-game trigger while the game is being played by a user, award the trophies, and keep track of the trophies that the user has triggered. One example of such a memory is shown as memory module 600 in trophy assignment module 218. Alternatively, the memory location may be remote from the trophy module 104.

Figure 3:
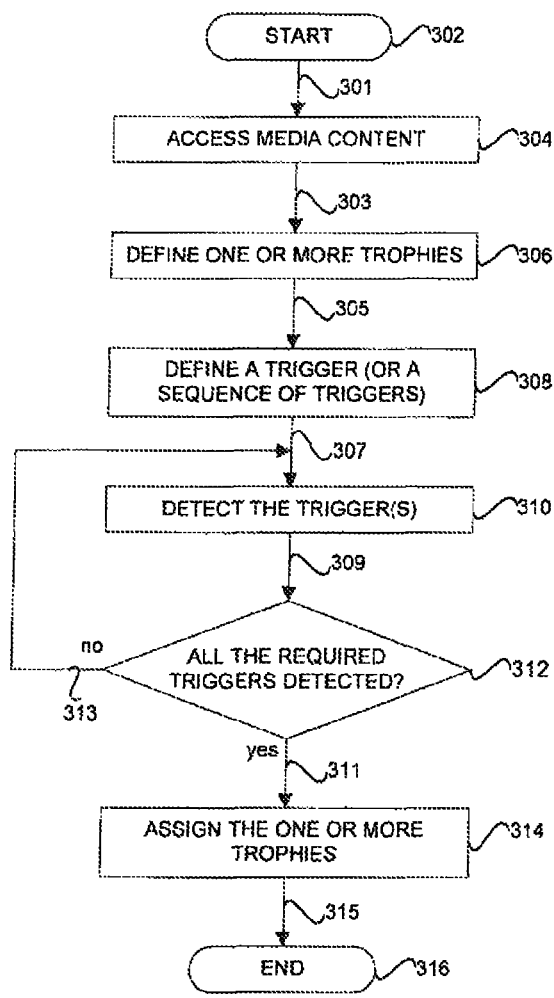
FIG. 3 shows an example of a series of steps of adding trophies to an existing game according to an embodiment of the present invention.

FIG. 3 shows an example of a series of steps of adding trophies to an existing game according to an embodiment of the present invention. The series of steps 300 may be stored on a non-transitory computer readable medium or media (e.g., RAM, ROM, EEPRPOM, DRAM or other memory, electronic storage device or registry) and may be executed by a processor or plurality of processors. The steps 300, may be computer code or other program code (e.g., source code) that may be compiled into object code. The code, stored on a medium and/or accessed, is a module, which may include electronic storage and/or processing functionality.

Generally, FIG. 3 shows, program code, or steps 300 of a trophy adding process that: defines a set of trophies and the in-game triggers; detects the in-game triggers while the game is being played by a user; and awards the trophies and keeps track of the trophies that the user has triggered. This computer code, or algorithm, may be stored in memory module 300 of memory 204 shown in FIG. 2.

Specifically, FIG. 3 shows that program code 300 begins with start step 302. Line 301 shows that in step 304 media content is accessed. The accessing of the media content is achieved, in one embodiment by using a title to accesses specific sectors on the disk media as the user progresses in a game, for example, at the start or end of a level, or when the player discovers something in the game, succeeds or fails to complete a level, or finishes the game, or other mechanism to identify a particular part or point in a game. The particular point is accessed by identifying the memory location on an electronic storage medium, or registry or server location or other electronic storage, or computer-readable medium.

Figure 4:
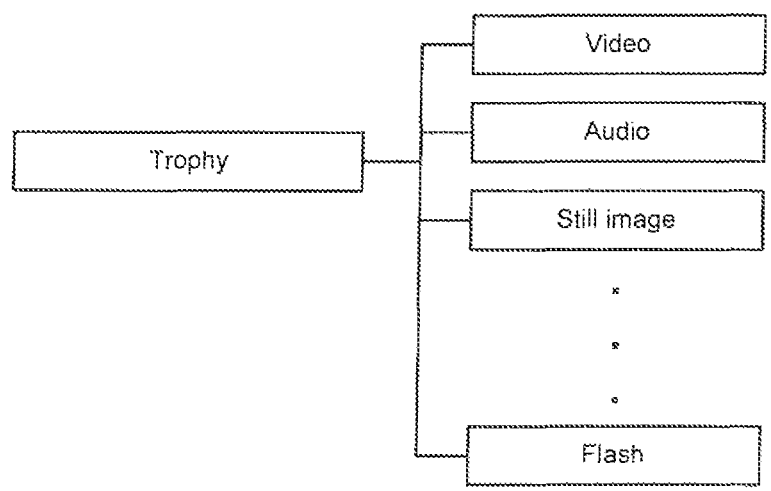
FIG. 4 illustrates an example of trophy according to an embodiment of the present invention.

Line 303 shows that in step 306 a set of trophies are defined. The defined trophies could include data in a plurality of formats, as shown in FIG. 4 which is described below. The set of trophies could be a set of only one trophy or multiple trophies. Also, the defined trophies could include electronic trophies as well as physical objects, or a combination of electronic trophies and physical objects. Electronic trophies include, for example, electronic icons, additional digital data, such as video footage, audio data (songs, melodies, etc.), photographic information, digital game accessories, tokens and other electronic representations. The physical objects may include physical trophy, physical game accessories, awards, ribbons and other physical objects that represent achievement or accomplishment.

FIG. 4 illustrates an example 400 of trophies according to an embodiment of the present invention. The defined trophies could be electronic trophies, such as video, audio, still image, flash file, and so on. For example, a specific video may be played when a particular game level is completed. In addition to the videos, there may be specific sounds, music, or speech that is played as a set of trophies of the game. The physical trophies have been described above.

Referring back to FIG. 3, after one or more trophies are defined, line 305 leads to step 308 in which a trigger or a sequence of triggers is defined. The disk access in-game can be tracked. As the game requests to read a particular sector from the disk, that read can trigger a trophy event. In addition there may be more complex events triggered via the disk sector mechanism. For example, if a game has three different endings, a trophy may be awarded after the player completes and watches all the three endings. The definition of a trophy trigger can be programmed such that a more "valuable" or sought after trophy has an increased or heighted criteria, or trigger, before the trophy will be awarded. Similarly, a low trigger threshold can be established for a less "valuable" or less sought after trophy. For example, playing a game for a predetermined amount of time may be a trophy trigger for a trophy that indicates the user logged a certain number of hours playing a game, regardless of the success of the player at the game.

Semi-automated tools may be used to analyze the contents of the disk media as well as in-game disk patterns to produce a palette of potential trophy triggers that an analyst or game producer can use to define the set of trophies for the title.

Line 307 shows that in step 310 the defined trophy trigger is detected. For example, using data analysis, the contents of the disk may be scanned, and specific file formats, such as video file formats, are identified and made viewable in a tool, so that an analyst may view the videos and select potential trophy triggers. For example, movies are one file used for triggers, and in this case, the movies could be extracted offline, and an analyst can allocate trophies to be unlocked when the triggers are accessed. In addition, the file name on the disk may be used to determine corresponding files, such as which level in the game.

By tracking in-game disk reading patterns, an analyst or programmer or game developer can actuate a button, or marker at the point in the game that they would like to create a trophy event trigger. By analyzing the disk reading pattern for unique sectors accessed around the time of the event, a potential trigger is identified. Thus, the desired number and level of one or more triggers is determined. The game, which was previously released without triggers is modified to include triggers. Furthermore, the quantity of triggers can be changed, either increased or decreased.

Line 309 shows that in step 312 a determination is made whether all the established that are required for a particular trophy, or level of success triggers are detected. If all the triggers for the particular trophy or level of success or acknowledgement have been detected, "yes" line 311 leads to step 314, in which the trophies would be assigned to the player. If not, "no" line 313 leads back to step 310 to detect other triggers.

When the trophies are awarded to a player, and/or as points are accumulated by a player, the trophy/trophies earned and the accumulated points, or earnings of the player are tracked. A database updated that stores data indicating earned trophies and accumulated points, so that a trophy is awarded the appropriate times to a player. For example, some trophies are awarded only once to a player, in other instances, the player can request additional awards of the same trophy. Additionally the database may contain partially earned trophies in the case where earning a trophy requires a sequence of triggers or multiple gaming sessions. This database may be a remote storage or data base such as, for example, GPMS database, or a local database, or a database accessed in a cloud computing or distributed computing environment.

After assigning the trophies or accumulating portions or progress toward a trophy, as shown in step 314, line 315 leads to an end step 316.

Figure 5:
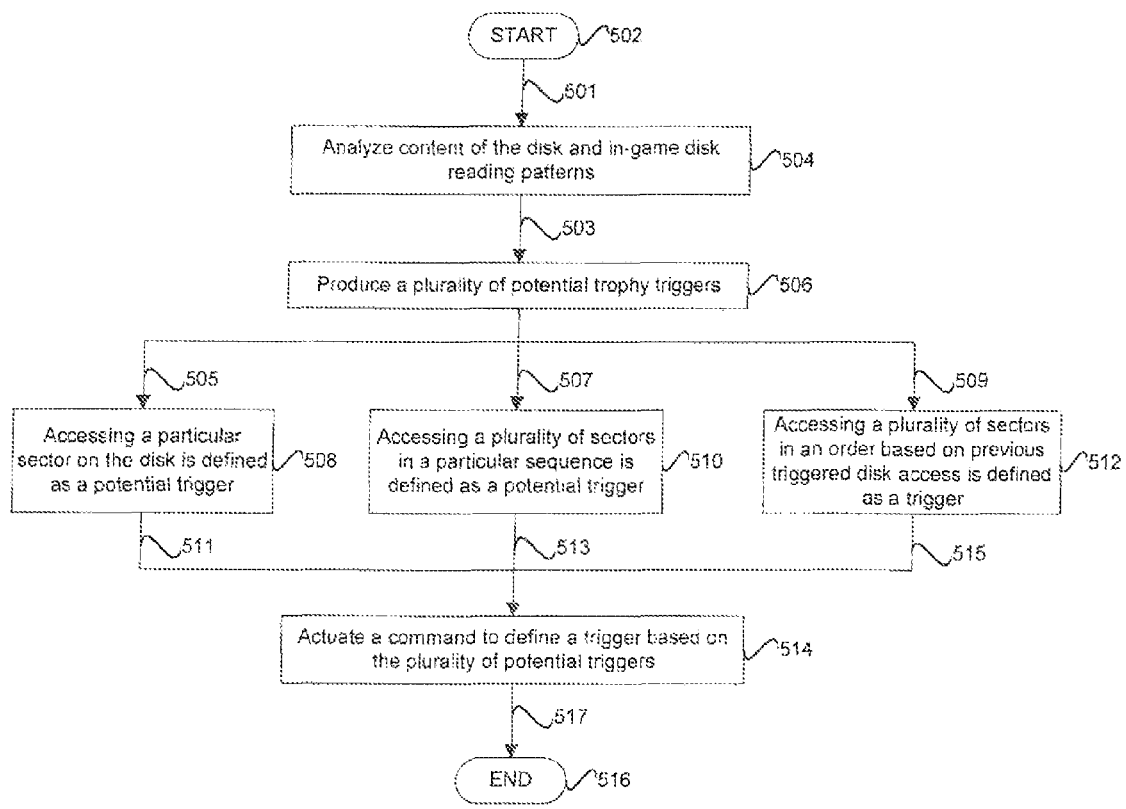
FIG. 5 shows a series of steps of defining a trophy trigger according to an embodiment of the present invention.

FIG. 5 shows a series of steps 500 of defining a trophy trigger according to an embodiment of the present invention. The series of steps 500 may be stored on an electronic storage medium, such as a non-transitory computer readable medium or media (e.g., RAM, ROM, EEPRPOM, DRAM or other memory, electronic storage device or registry) and may be executed by a processor or plurality of processors. The steps 500, may be computer code or other program code (e.g., source code) that may be compiled into object code. The code, stored on a medium and/or accessed, is a module, or facility or unit. Also, the memory storing the code and an associated processor is also a module or facility or unit.

FIG. 5 shows that program code 500 begins with step 502. Line 501 shows that in step 504 content of the disk and in-game disk reading patterns is analyzed.

Line 503 shows that in step 506 a plurality of potential trophy triggers are produced.

Based on the produced triggers, line 505 leads to step 508 in which accessing a particular sector on the disk is defined as a potential trigger, and line 511 leads to step 514. Line 507 leads to step 510 in which accessing a plurality of sectors in a particular sequence is defined as a potential trigger, and line 513 leads to step 514. Line 509 leads to step 512 in which accessing a plurality of sectors in an order based on previous triggered disk access is defined as a potential trigger, and line 515 leads to step 514.

In step 514 a command is actuated to define a trigger based on the plurality of potential triggers. This step may also include "awarding" the trigger to a player by providing (transmitting, assigning etc.) the trophy to the player's account. Line 517 leads to an end step 516.

Figure 6:
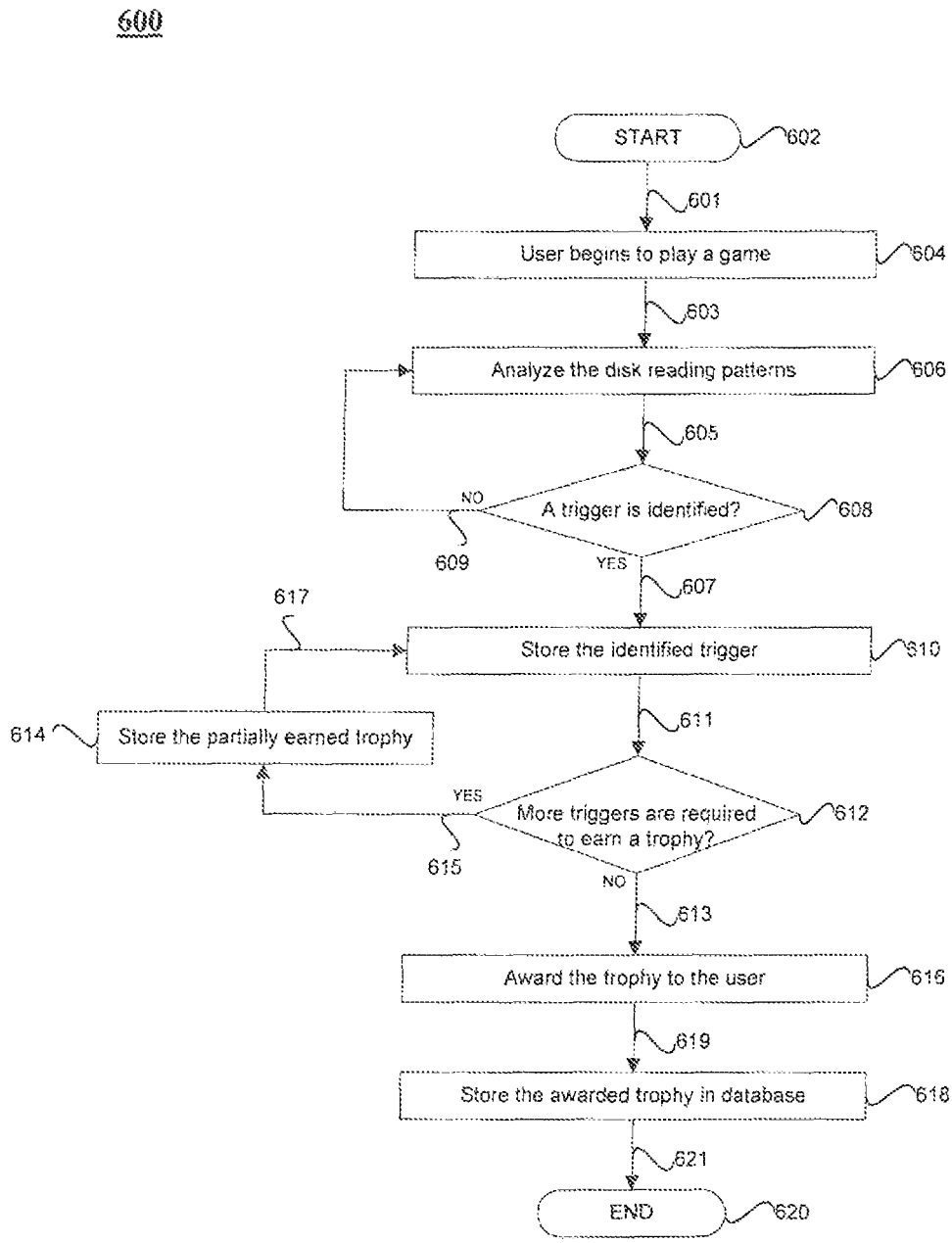
FIG. 6 shows another example of a series of steps of adding trophies to an existing game according to an embodiment of the present invention.

FIG. 6 shows another example of a series of steps 600 of assigning trophies to an existing game according to an embodiment of the present invention. The series of steps 600 may be stored on an electronic, storage medium, such as a non-transitory computer readable medium or media (e.g., RAM, ROM, EEPRPOM, DRAM or other memory, electronic storage device or registry) and may be executed by a processor or plurality of processors. The steps 600, may be computer code or other program code (e.g., source code) that may be compiled into object code. The code, stored on a medium and/or accessed, is a module, facility or unit. Also, the code stored on a medium and accessed by a processor (either local or remote or a combination of the two) is also a module, facility or unit.

FIG. 6 shows that program code 600 begins with step 602. Line 601 shows that in step 604 a user begins to play a game, or access media content or engage in an on-line activity.

Line 603 shows that in step 606 the disk reading patterns are analyzed.

Line 605 shows that in step 608 a determination is made whether a trigger is identified. If the trigger is already identified, "yes" line 607 leads to step 610, in which the identified trigger is stored. This storage location may be a remote storage or data base such as, for example, GPMS database or a local data storage location. If not, "no" line 609 leads back to step 606 to analyze the disk reading patterns.

After storing the identified trigger in step 610, line 611 leads to step 612 in which a determination is made whether more triggers are required to earn a trophy. If more triggers, or triggering events, are required, "yes" line 615 leads to step 614 to store the partially earned trophy, and then line 617 leads back to step 608 to identify other triggers, or triggering events. If there are no more triggers, or triggering events, required, "no" line 613 leads to step 616 in which the trophy is awarded to the user. This may be done by transmitting an electronic trophy or sending a notification that a physical award, such as a T-shirt, accessory or other physical merchandise, has been earned by the player.

Line 619 shows that in step 618 the awarded trophy may be stored in an electronic database. The database may be a local database or remote storage or data base such as, for example, GPMS database.

After storing the awarded trophy, line 621 leads to an end step 620.

In the present invention, when there is a new application available, a trophy module software update may be used to update the process to reflect the new award, application or other amended information.

It will be appreciated from the above that the invention may be implemented as computer software, which may be supplied on a storage medium or via a transmission medium such as a local-area network or a wide-area network, such as the Internet. It is to be further understood that, because some of the constituent system components and method steps depicted in the accompanying Figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

It is to be understood that the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

What is claimed is:

1. A computer-implemented method for assigning one or more trophies to a user, comprising:

accessing electronic media content stored on a computer-readable storage medium;

defining one or more trophies;

defining a trigger associated with the media content;

detecting the trigger during media content access; and assigning the one or more trophies to a user account that is associated with the user in response to the detected trigger, wherein the defined trigger includes the computer accessing a particular location on the computer-readable medium that stores the media content.

2. The method according to claim 1, wherein the defined trigger includes accessing a plurality of sectors in a particular sequence.

3. The method according to claim 1, wherein the defined trigger includes accessing a plurality of sectors in a particular sequence based on previous triggered disk access.

4. The method according to claim 1, further comprising:
    storing trophies that have been assigned in a database.

5. The method according to claim 4, wherein each of the one or more trophies is assigned to a single user.

6. The method according to claim 4, wherein when a sequence of triggers is required to trigger a trophy, partially earned trophies are stored in the database.

7. The method according to claim 1, further comprising:
    analyzing content of the disk media and in-game disk reading patterns to produce palette of potential trophy triggers, using semi-automated tools.

8. The method according to claim 7, wherein the produced palette of potential trophy triggers is used to define the set of trophies.

9. The method according to claim 1, further comprising:
    scanning the content of the disk; and
    identifying the file format, thereby making the content viewable in a tool.

10. The method according to claim 9, wherein the user views the files and selects a trophy trigger among a plurality of potential trophy triggers.

11. The method according to claim 9, wherein the file names on the disk determine a corresponding file.

12. The method according to claim 1, wherein the user defines a trigger by actuating a command at a particular time during media content access when tracking in-game disk reading patterns.

13. The method according to claim 7, further comprising:
    identifying a potential trigger by analyzing the disk reading patterns for unique sectors accessed within a predetermined time period of displaying a trophy.

* * * * *